June 17, 1969 YASUSABURO KOBORI 3,450,414

SAFETY DEVICE FOR VEHICLE PASSENGERS

Filed Oct. 21, 1966 Sheet 1 of 7

United States Patent Office 3,450,414
Patented June 17, 1969

3,450,414
SAFETY DEVICE FOR VEHICLE PASSENGERS
Yasusaburo Kobori, Tokyo, Japan, assignor to Kabushikikaisha G.I.C. Tokyo, Japan, a corporation of Japan
Filed Oct. 21, 1966, Ser. No. 588,563
Claims priority, application Japan, Nov. 6, 1965, 40/68,149; Jan. 19, 1966, 41/2,598
Int. Cl. B60r 21/00
U.S. Cl. 280—150                                8 Claims This invention relates to a safety device for vehicle passengers, and more particularly to a safety device for protecting the life of passengers or breakage of other objects in collisions of vehicles such as automobiles, trains, airplanes, ships and so on.

It is known that in the event of a vehicle crash, the passengers, or any unfastened object placed in the vehicle, will be thrown against a fixed portion of the vehicle by the inertia of such passenger or object. When, for example, a medium sized automobile, in which the distance between a passenger or object in the rear seat and the back of the front seat is about 600 mm., crashes into a solid wall at a speed of 50 k.p.h. (13.9 m./sec.), the passenger or object will be brought into contact with the back of the front seat in approximately 0.0435 second after the moment of crash. It follows, therefore, that if in this case, an effective shock-absorbing medium could be built up within this period of time (0.0435 sec.) between the back of the front seat and the forward moving body so as to avoid direct contact of the body with the front seat, it would definitely serve as a life-protecting device. In the present invention, the above requirement is fulfilled by the employment of a conveniently located shock-absorbing bag capable of being inflated well within the period of time described. For the inflation of the shock-absorbing bag high pressure gas is employed, which can readily be delivered into the bag at a speed approaching that of sound (about 330 m./sec.). This delivery speed is approximately 23 times the speed at which the passenger or object is thrown from the seat by the impact of the collision (13.9 m./sec.).

Briefly stated, the present invention resides in the provision of a safety device having normally deflated bags installed in a vehicle at convenient locations and which is adapted so that upon the occurrence of a collision a noninflammable gas generating material is rapidly evaporated to produce high pressure gas and the gas is delivered into protective bags to inflate them, thus providing shock-absorbing cushions between passengers or other objects and hard parts of the vehicle.

It is one object of this invention to provide a safety device for vehicle passengers with which it is possible to protect the life of passengers in the event of a crash.

It is another object of this invention to provide a safety device for preventing breakage of objects carried in a vehicle or minimizing damages to the vehicle itself when the vehicle becomes involved in an accident.

It is still another object of this invention to provide a safety device for vehicle passengers embodying an impact-detecting unit by which an electric circuit is closed automatically on encountering the impact of a crash, and with provisions for controlling its sensitivity so that it would not be effected by disturbances short of a crash impact.

It is a further object of this invention to provide a safety device for vehicle passengers having high pressure gas generating means which are ignited by an electric circuit closed in response to the functioning of an impact detecting unit, thereby generating high pressure gas instantaneously.

It is a still further object of this invention to provide a safety device for vehicle passengers having inflatable protective bags which are instantaneously inflated with high pressure gas, assuming their protective positions between the passengers or objects and rigid parts of the vehicle.

It is another object of this invention to provide a safety device for vehicle passengers having a canopy means for minimizing the recoil of a high pressure container caused by the sudden release of gas from the container.

Other objects, features and advantages of this invention will become apparent from the following description taken in conjunction with the accompanying drawings, in which.

Figure 1:
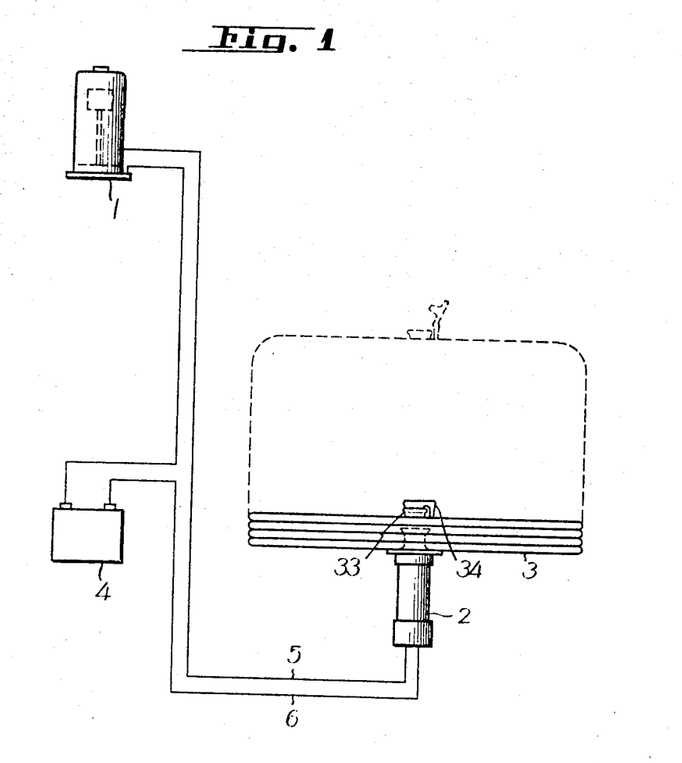
FIGURE 1 is a diagram schematically illustrating the entire layout or a device produced in accordance with the present invention.

With reference to the drawings the present invention will be described in detail. In FIGURE 1 reference numeral 1 indicates an impact-sensitive electric triggering unit, 2 a gas producer unit for generating high pressure gas by evaporation of a noninflammable gas generating material, and 3 an elastic inflatable protective bag connected to the high pressure gas producer unit 2. The protective bag 3 is normally deflated and folded as indicated in full line and is inflated by the supply of high pressure gas as shown in broken line, upon the occurrence of a collision. Reference numeral 4 designates an electric power source such as a battery, 5 and 6 lead wires respectively interconnecting the aforementioned constituents.

Figure 2:
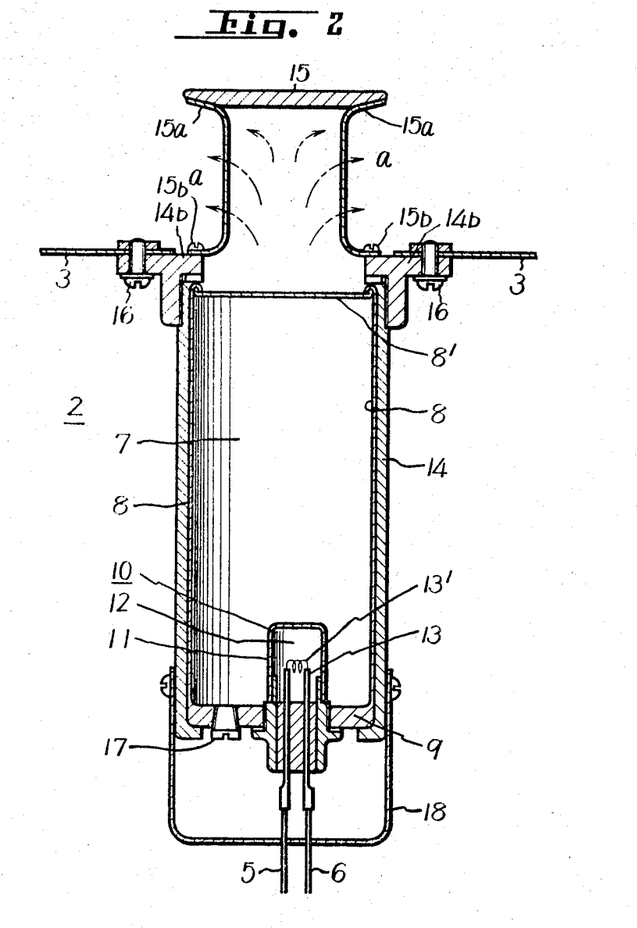
FIGURE 2 is a longitudinal-sectional view showing one example of a gas producer unit of the device according to this invention.

In FIGURE 2 there is schematically illustrated, by way of example, the construction of the high pressure gas producer unit 2. Reference numeral 7 identifies a noninflammable gas generating material such as dichlorodifluoromethane (Freon 12), liquid propane gas, solid ethyl alcohol or the like, which is contained in a sealed container 8. The bottom 9 of the sealed container 8 has attached thereto a detonating cap 10. The detonating cap 10 has contained in its cartridge 11 an initial explosive 12 such as black powder or the like and a pair of electrodes 13 having a resistance wire 13' inserted therebetween. The electrodes 13 are connected to the lead wires 5 and 6. The black powder is an explosive consisting of powdered potassium nitrate $KNO_3$, sulfur S and charcoal C in the ratio of 74 to 10.4 to 15.6 in weight percentage. The amount of the black powder used in about 18 grams. The sealed container 8 is accommodated in a high pressure container 14 and a shock-absorbing canopy plate 15 is disposed above the opening of the container 14 for the purpose of preventing reaction due to sudden release of gas from the sealed container 8. In this case, the canopy plate 15 is attached to a supporting member 14b through connecting members 15a one ends of which are fixed to the supporting member 14b by bolts 15b or the like and the other ends of which are fixed to the canopy plate 15.

Further, the inflatable protective bag 3 is attached by bolts 16, 16 or the like to the supporting member 14b of the high pressure container 14 in an airtight manner.

Upon explosion of the inital explosive 12 due to a flow of electric current through the resistance wire 13', the non-inflammable gas generating material contained in the sealed container 8 is rapidly evaporated to produce high pressure gas, by the force of which a diaphragm 8' is ruptured. The high pressure gas passes through the ruptured diaphram 8' and impinges on the canopy plate 15 and then expands immediately into the protective bag 3, as indicated by arrows a, inflating it. The reaction to the high pressure container 14 due to the sudden delivery of gas is offset by its impingement upon the canopy plate 15. The gas is thus delivered into the protective bag 3 to inflate it. Reference numeral 17 designates a screwed plug for plugging the hole through which the noninflammable gas generating material 7 is introduced into the sealed container 8 and 18 a protective cover.

In accordance with this invention an exhaust or relief valve 33 is provided in the protective bag 3 at a suitable position, for example, at the center of the top of the bag 3, as illustrated in FIGURE 1. The relief valve 33 is designed so that its plug 34 is blown off by the pressure of the gas, as indicated in broken lines, when the internal pressure of the gas in the bag 3 exceeds a predetermined value during the inflation of the bag 3, thereby lowering the internal pressure of the bag 3.

In the event of a collision of a moving automobile the deceleration of the human body or other object in the automobile striking against the bag 3 is usually in the order of several G or in exceptional cases somewhat over ten G (G: the acceleration of gravity), so that when the human body strikes against the protective bag 3 the internal pressure of the bag 3 rises suddenly, thereby tending to decrease the cushioning effect thereof. With the provision, however, of the exhaust valve 33 in the bag 3, the internal pressure of the bag 3 lowers rapidly toward normal atmospheric pressure.

With such an arrangement, a shock-absorbing cushion can be provided which is fully effective in practice. Moreover, the bag can be folded down with ease by taking advantage of the relief valve. It is a matter of course that the relief valve may be made in the form of a saftey valve which actuates at a pressure exceeding a predetermined value.

Figure 3:
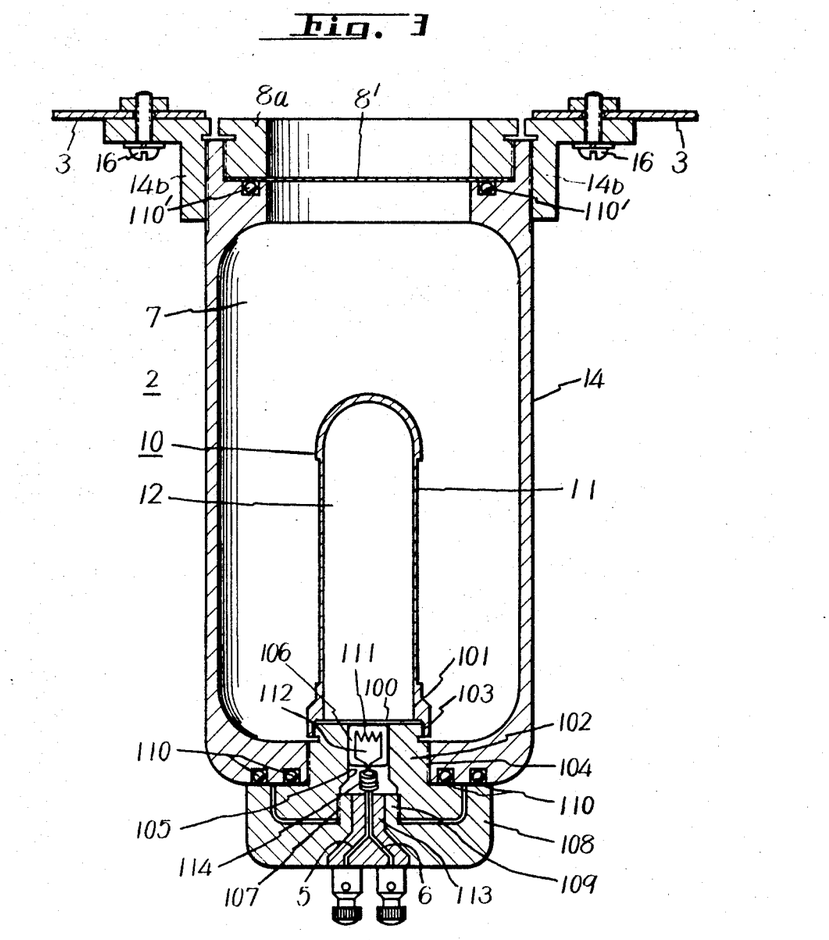
FIGURE 3 is a longitudinal-sectional view showing another example of the gas producer unit.

It is in handling the initial explosive that the greatest care should be taken in assembling the high pressure gas producer unit 2. FIGURE 3 schematically illustrates a modified form of the high pressure gas producer unit 2, wherein the initial explosive 12 such as black powder is contained in the cartridge 11 and a thin cover plate 100 is attached to the bottom of the cartridge 11. Reference numeral 101 indicates the base of the cartridge 11, which is screwed on to the end portion of a first plug 102, as identified at 103. The first plug 102 is in turn screwed on to the high pressure container 14 at its diametrically increased portion 104. Further, the first plug 102 has a centrally disposed aperture 105 and a central projection of a second plug 108 is threadably inserted into the end portion 107 of the central aperture 105. Lead wires 5 and 6 are passed through the central projection 109 of the second plug 108 and insulated by an insulating member 113 made of a plastic material or the like, the inner ends of the lead wires 5 and 6 being connected to a detonating cap 106 through a coiled portion 114 of sufficient length. Reference numerals 110 and 110' designate gaskets of suitable material. Reference numeral 8a is a ring for pressing the diaphragm 8' onto the opened end of the container 14 in an airtight manner. Within the detonating cap 106 there are contained a heating resistor 111 and an explosive 112, both ends of the resistor 111 being connected to the lead wires 5 and 6. In place of the resistor 111, a spark gap may be formed with opposing electrodes.

The aforementioned members are assembled into the high pressure gas producer unit in the following manner. In the first place the detonating cap 106 is inserted into the central aperture 105 of the first plug 102 and then the second plug 108 is threadably inserted into the first plug 102. In this case, it is preferred that the coiled portion 114 of the lead wires is made long enough not to impede the insertion of the second plug 108. Thereafter, the base 101 of the cartridge 11 is threadably engaged with the first plug 102 and then the first plug 102 is threadably inserted into one end of the high pressure container 14. During this assembling procedure the detonating cap 106 is in no way subjected to friction and hence danger of explosion of the detonating cap 106 can be averted.

By the above-described arrangement the cartridge 11 loaded with the initial explosive and the detonating cap 106 can be kept under storage separately until the time they are to be assembled with the high pressure container 14. This eliminates the danger of any accidental explosion outside of the high pressure container.

Upon flowing of electrical current through the lead wires 5 and 6, the resistor 11 is heated and the heat generated ignites the explosive 112 contained in the detonating cap 106 to produce an explosion. This leads to explosion of the initial explosive 12 contained in the cartridge 11, by the heat of which the noninflammable gas generating material 7 contained in the high pressure container 14 is immediately evaporated to produce gas under pressure.

Figure 4:
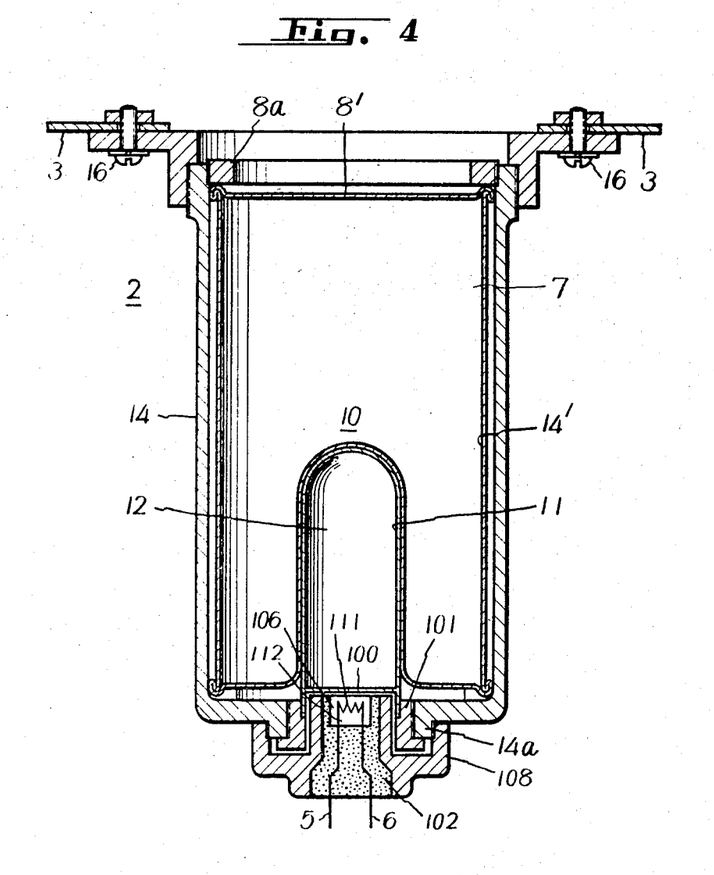
FIGURE 4 is a longitudinal-sectional view, similar to FIGURES 2 and 3, showing still another example of the gas producer unit.

In FIGURE 4, another modification of the high pressure gas producer unit 2 is diagrammatically illustrated, wherein an auxiliary container 14' containing therein a high pressure gas generating material is housed in the high pressure container 14. The use of such an auxiliary container 14' facilitates handling of the high pressure container, namely instead of charging the high pressure container 14 with high pressure gas generating material directly from a gas cylinder, it is only necessary to insert the auxiliary container 14', previously charged with high pressure gas generating material, into the high pressure container 14 when required. Further, the cylindrical support 101 is threadably engaged with the inner wall of a collar 14a of the high pressure container 14 to thereby secure the cartridge 11. The second plug 108 holding the first plug 102 is threadably engaged with the outer wall of the collar 14a, so that the detonating cap 106 is mounted on the high pressure container 14 separately with the cartridge 11. In this figure parts corresponding to those in FIGURE 3 are identified by the same reference numerals and no detailed description will be given for sake of brevity.

Figure 5:
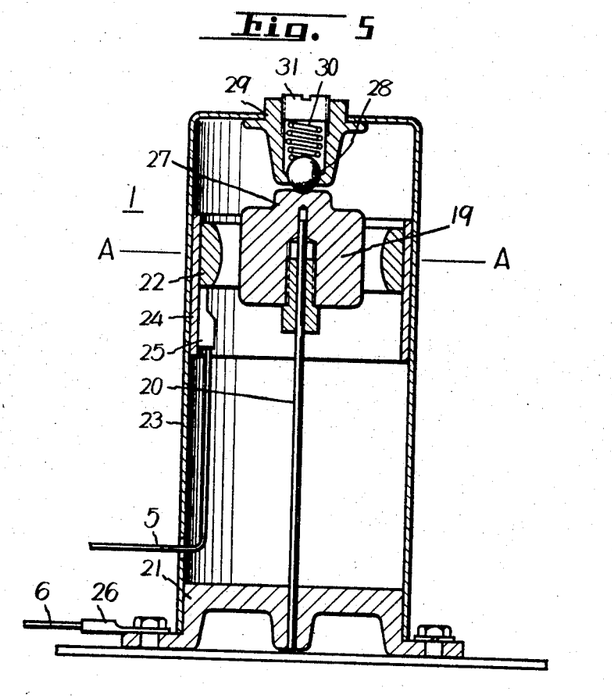
FIGURE 5 is a longitudinal-sectional view schematically illustrating an impact-sensitive electric triggering unit used in this invention.
Figure 6:
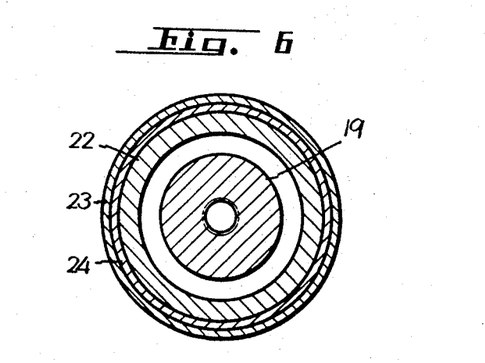
FIGURE 6 is a cross-sectional view taken along the line A—A in FIGURE 5.

FIGURES 5 and 6 schematically show an embodiment of the impact-sensitive electrical actuating unit 1 illustrated in FIGURE 1. The actuating unit 1 is designed to pick up impacts applied from any horizontal direction. Reference numeral 23 indicates a casing of the actuating unit 1. As clearly shown in the figures, a conductive weight 19 is supported by a resilient conductive rod 20 which is in turn anchored to a conductive base 21, and a conductive ring 22 is mounted on the inside of the casing 23, surrounding the weight 19. Between the casing 23 and the conductive ring 22 is disposed an insulator 24. Lead wires 5 and 6 are connected respectively to terminals 25 and 26 located on the inside of the casing 23 and on the conductive base 21. With such an arrangement, in the case of a collision the weight 19 is thrown out of its normally seated position by the sudden impact of the collision, bringing it into direct contact with the conductive ring 22, thereby closing an electric circuit through the terminals 25 and 26. In order to prevent unwanted actuation of the impact-sensitive triggering unit 1 due to relatively minor shocks, or synchronous vibration of the resiliently supported weight system, a slight depression for receiving a sphere 28 is formed on the top of a projection 27 of the weight 19 and the sphere 28 is pressed against the depression by means of a spring so as to suitably restrict the movement of the weight 19. The sphere 28 is rotatably enclosed in a case 29 mounted on the inside of the top of the casing 23 and the sphere 28 is pressed downwards by a coiled spring 30. Mounted on the top of the case 29 is a screw 31, by which the pressure of the spring 31 exerted upon the sphere 28 can be adjusted. In this manner, the sphere 28 is pressed downwards under a suitable pressure so as to ensure that the weight 19 would not be thrown out of position and make contact with the conductive ring 22 in an ordinary conditions such as minor shocks or synchronous vibrations of the system including the weight 19 produced during usual travel of the the vehicle. Further, the mass of the weight 19 and the stiffness of the resilient rod 20 are suitably adjusted so that the impact-sensitive actuating unit is made to be sensitive only to shocks exceeding a certain value such as those applying an acceleration of, for example, ten G to the weight 19, while being insensitive to minor shocks such as in the case of sudden braking at a relatively low speed.

The foregoing example employs a single undivided conductive ring. However, it is possible to separately detect a shock from before and behind or from right and left by the provision of a conductive ring consisting of two, four or more conductive segments each having a terminal.

Figure 7:
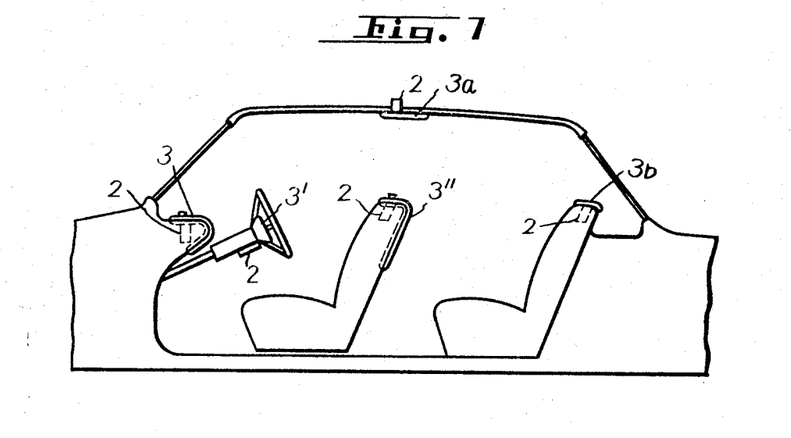
FIGURE 7 is a fragmentary longitudinal-sectional view schematically illustrating an automobile body having an embodiment of this invention mounted therein.

FIGURE 7 illustrates an automobile having mounted therein the device of this invention, in which protective bags 3, 3′, 3″ . . . are provided in deflated condition on the instrument panel, the steering wheel, the back of the front seat and so on, while a gas producer unit 2 and an impact-sensitive triggering unit 1 (not shown) are disposed at convenient locations. The protective bags are usually made of a soft but airtight material such as vinyl chloride, rubber or the like, and they are normally folded down in deflated condition as illustrated in the figure.

Figure 8:
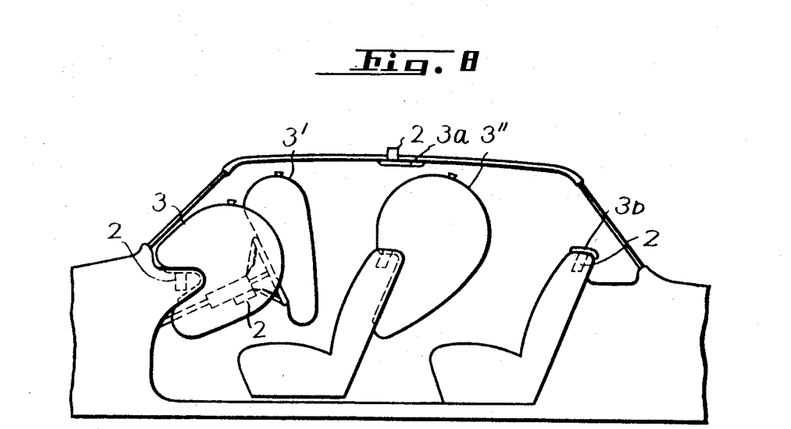
FIGURES 8 and 9 are fragmentary longitudinal-sectional views similar to FIGURE 7 and showing some of the protective bags in inflated condition, following a collision.

In FIGURE 8 the protective bags 3, 3′ and 3″ are shown in inflated condition. Passengers or other objects in the automobile are protected from shocks by the cushioning effect of the inflated bags in the case of a head-on collision.

Figure 9:
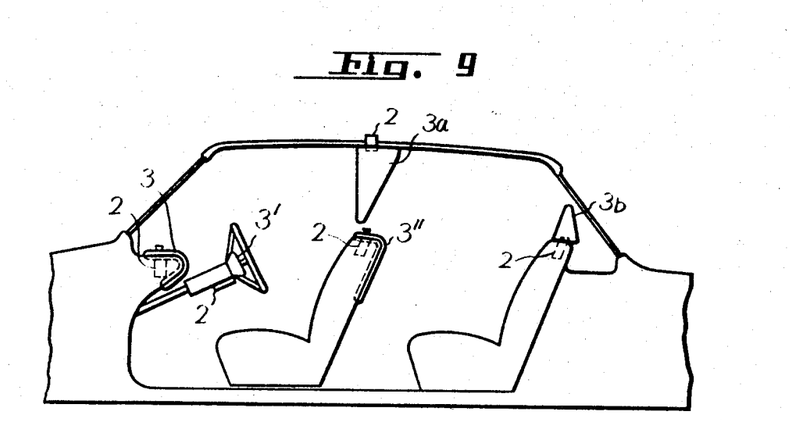

FIGURE 9 illustrates similar protective bags 3a and 3b which protect passengers or other objects in the automobile from shocks applied to them from behind as in the case of a rear-end collision. Upon the occurrence of a rear-end collision the protective bags 3a and 3b are inflated to assume protective positions, thus preventing whiplash injuries. The protective bags 3, 3′ 3″, 3a and 3b may be installed at any other suitable location such as at side windows, ceiling, etc.

A description will be hereinbelow given in connection with the operation of the safety device produced in accordance with the present invention. When a travelling vehicle fitted with this device collides with another object the inertia of the weight 19 overcomes the holding force of the spring-loaded sphere with the result that the weight 19 is thrown out of position and hits the conductive ring 22, thereby closing the electrical circuit as described previously. Upon the flow of electrical current across the electrodes 13 the explosive 12 is heated so as to produce an explosion of the detonating cap 106. This leads to explosion of the initial explosive 12, by the heat energy of which the noninflammable gas generating material 7 is in turn immediately evaporated, thus producing a large quantity of high pressure gas. The high pressure gas generated is delivered into the protective bags 3, 3′, 3″ . . . to inflate them, thus providing safety cushions between passengers or other objects and rigid surfaces of the vehicle. That is, the bags are immediately inflated before the passengers or objects are thrown against the hard parts of the vehicle, so that injury to the passengers or breakage of the objects can be prevented effectively. Further, the reaction due to the sudden release of high pressure gas from the high pressure container 14 is offset by the canopy plate 15 and the flow of gas does not strike directly against the bag, so that the bag is not damaged by the high pressure gas stream.

According to the results of actual impact tests in which dichlorodifluoromethane and black powder were employed for the high pressure gas generating material and the initial explosive, respectively, the protective bags were fully inflated in 0.008 to 0.017 second after the instant of collision. This time is by far shorter than the aforementioned time of 0.0435 second. This implies that the protective bags are inflated to provide cushions well before passengers or objects are thrown against the front glass, the seats and so on by the impact of a collision.

Although this invention has been described with reference to an automobile, the principles of this invention can be applied as safety devices to various other vehicles such as airplanes, ships and the like.

It is apparent that many modifications and variations may be effected without departing from the scope of the novel concepts of this invention.

The invention, therefore, is to be limited only as indicated by the scope of the appended claims.

What I claim is:

1. In a safety device for vehicle passengers having a high pressure gas container enclosing noniflammable gas generating material for producing a large quantity of high pressure gas instantaneously upon being heated at a high temperature and being provided with an outlet opening for such high pressure gas, heating means operable to effect the high temperature heating of said gas generating material in said container, electrical circuit means for operating said heating means and including impact-sensitive means for actuating said circuit means, and an inflatable protective bag attached to said high pressure gas container around said outlet opening of the latter; the improvement comprising shock-absorbing means mounted on said high pressure gas container within said protective bag, said shock-absorbing means being spaced from said outlet opening and interposed in the path of high pressure gas issuing from said opening so as to laterally divert such gas within the bag for absorbing the reaction of the issuing high pressure gas without substantial attenuation of the gas speed, whereby to make possible the substantially instantaneous inflation of the bag.

2. A safety device for vehicle passengers according to claim 1, wherein said shock-absorbing means consist of a canopy plate and canopy plate supporting means, said canopy plate being fixed to said high pressure gas container within said protective bag by said supporting means with said canopy plate disposed substantially parallel to the plane of said outlet opening and spaced therefrom and with radially opening gaps being provided between said supporting means.

3. A safety device for vehicle passengers according to claim 1, wherein said heating means includes a cartridge having enclosed therein igniting means connected to said electric circuit means, for energizing by the latter and an explosive to be exploded upon energizing of said igniting means, said cartridge being disposed in said high pressure gas container enclosing the moninflammable gas generating material.

4. A safety device for vehicle passengers according to claim 1, wherein said heating means includes a detonating cap enclosing igniting means connected to said electric circuit means for energizing by the latter and an explosive charge to be exploded upon energizing of said ignition means, and a cartridge enclosing an explosive to be exploded in response to explosion of said charge of the detonating cap, said cartirdge being disposed in said container enclosing the noninflammable gas generating material.

5. A safety device for vehicle passengers according to claim 1, wherein said impact-sensitive means includes a base, a resilient rod planted at one end in said base, a conductive weight mounted on the free end of said rod and having a depression in the top surface thereof, a conductive ring disposed about the weight, said electric circuit means including said weight and the conductive ring, a sphere engageable in said depression of said weight, a spring resiliently pressing said sphere against said weight to hold the latter in a normal position spaced from said ring, said electric circuit means being closed when said weight is thrown out of said normal position by an impact and strikes against the conductive ring.

6. A safety device for vehicle passengers according to claim 5, wherein said heating means includes a cartridge enclosing an initial explosive and disposed in said high pressure gas container, electric igniting means inserted in said cartridge to detonate said explosive upon the energizing thereof, and means for connecting said igniting means to the electric circiut means including said weight and conductive ring so as to energize said igniting means when said weight strikes the conductive ring.

7. A safety device for vehicle passenger according to claim 5, wherein said heating means includes a cartridge enclosing an initial explosive and being disposed in said high pressure gas container, a detonating cap enclosing an explosive charge and electric igniting means, a thin base plate disposed between said cartridge and said detonating cap, attaching means for attaching said cartridge and said detonating cap to said high pressure gas container, and connecting means for connecting said igniting means to said electric circuit means including said weight and said conductive ring, said attaching means consisting of a first plug having a central aperture for said detonating cap to be inserted therethrough and a second plug holding said detonating cap, said cartridge being threadably inserted into said first plug, said second plug being threadably inserted into said first plug and said first plub being threadably inserted into said high pressure gas container.

8. A safety device for vehicle passengers according to claim 1, wherein said protective bag attached to said high pressure gas container is normally folded in deflated condition and has an exhaust valve operable by a predetermined pressure of the gas introduced thereinto, said valve being located on said bag so as to be shielded from the direct impingement thereagainst of the entering gas by said shock-absorbing means.

References Cited

UNITED STATES PATENTS

| | | | |
|---|---|---|---|
| 2,850,291 | 9/1958 | Ziccardi | 280—150 |
| 3,122,181 | 2/1964 | Herbenstreit | 23—281 |
| 3,163,014 | 12/1964 | Wismar | 23—281 |

KENNETH H. BETTS, *Primary Examiner.*

J. E. SIEGEL, *Assistant Examiner.*